(12) United States Patent
Crumm et al.

(10) Patent No.: US 7,960,069 B2
(45) Date of Patent: Jun. 14, 2011

(54) COMPOSITE INSULATION ASSEMBLY FOR A FUEL CELL

(75) Inventors: Aaron Crumm, Ann Arbor, MI (US); Jonathan R. Rice, Whitmore Lake, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 958 days.

(21) Appl. No.: 11/670,554

(22) Filed: Feb. 2, 2007

(65) Prior Publication Data

US 2008/0187811 A1 Aug. 7, 2008

(51) Int. Cl.
*H01M 2/20* (2006.01)
*H01M 8/24* (2006.01)
*H01M 8/04* (2006.01)
*H01M 8/00* (2006.01)

(52) U.S. Cl. .................. 429/469; 429/433; 429/455
(58) Field of Classification Search .............. 429/34, 429/35, 507, 508, 509, 469, 433, 535
See application file for complete search history.

(56) References Cited

U.S. PATENT DOCUMENTS 4,430,390 A * 2/1984 Fekete ...................... 429/34
5,750,278 A * 5/1998 Gillett et al. .............. 429/24

OTHER PUBLICATIONS

Roy et al., "Concrete Microstructure Porosity and Permeability", published by the National Academy of Sciences, 1993.*
Manuscript—"Microtherm® microporous insulation vs. Aspen Pyrogel XT aerogel blanket—a comparison of the two market leading products. An overview of characteristics, performance, handling, and benefits." available at www.microthermgroup.com.

* cited by examiner

*Primary Examiner* — Patrick Ryan
*Assistant Examiner* — Julian Mercado
(74) *Attorney, Agent, or Firm* — Dickinson Wright PLLC

(57) ABSTRACT

In one aspect, there is disclosed a high temperature composite insulation assembly for a fuel cell that includes a core portion having inner and outer surfaces. A temperature stable sealant is disposed on the outer surface of the core portion forming a gas retaining mechanically robust insulation assembly. In another aspect, there is disclosed a high temperature composite insulation assembly for a fuel cell that includes a core portion having inner and outer surfaces, and a reinforcing material disposed on the outer surface of the core portion. A temperature stable sealant is disposed on the outer surface of the core portion forming a gas retaining mechanically robust insulation assembly. In another aspect, there is disclosed a high temperature composite insulation assembly for a fuel cell that includes a core portion having inner and outer surfaces and a high temperature refractory material disposed on the inner surface of the core portion. A reinforcing material is disposed on the outer surface of the core portion and a temperature stable sealant is disposed on the outer surface of a core portion forming a gas retaining mechanically robust insulation assembly.

12 Claims, 3 Drawing Sheets

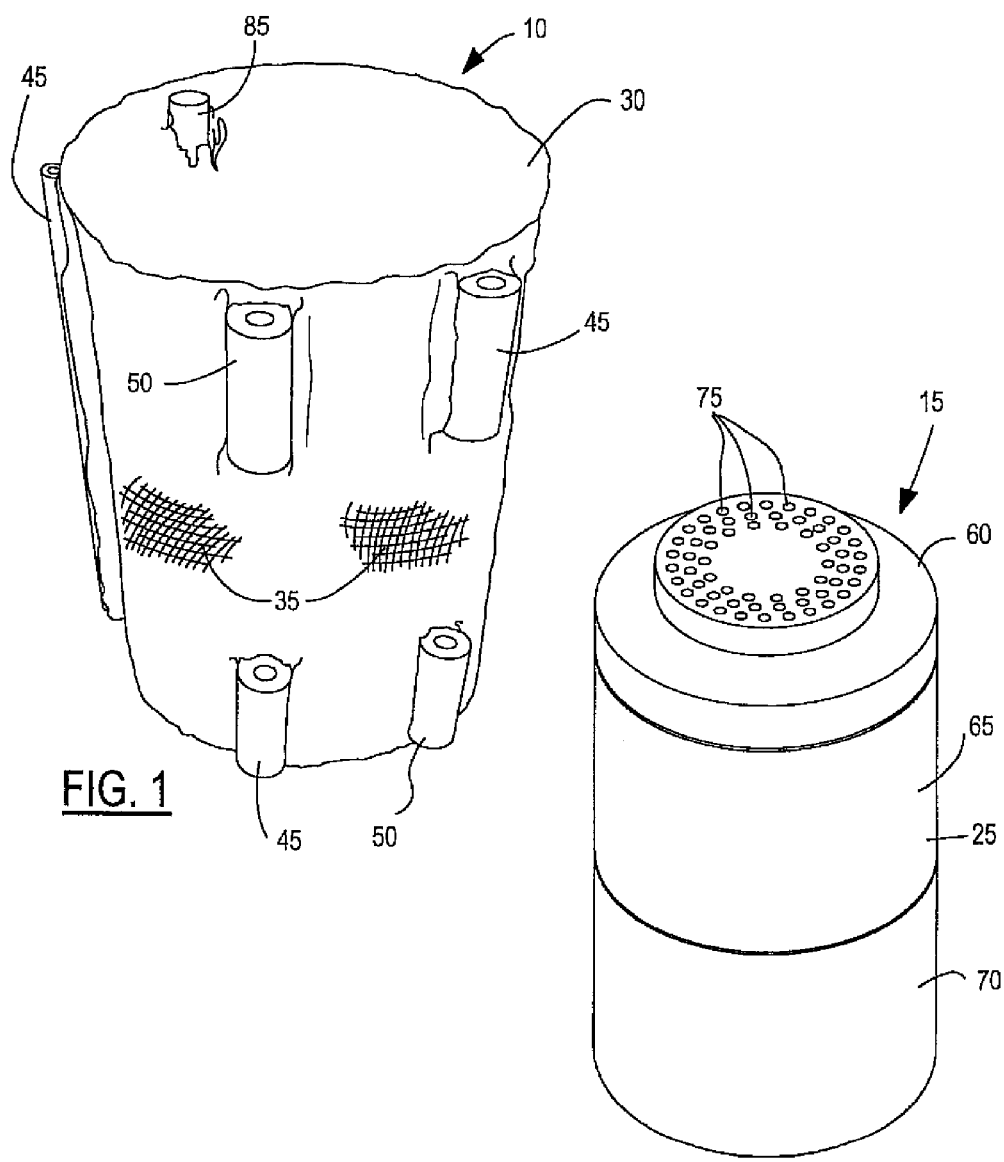

COMPOSITE INSULATION ASSEMBLY FOR A FUEL CELL

GOVERNMENT INTERESTS

This invention was made with government support under contract number W31PHQ04CR164, awarded by the United States Department of Defense. The government has certain rights in this invention.

FIELD OF THE INVENTION

The invention relates to fuel cells, and more particularly to high temperature insulation assemblies for fuel cells.

BACKGROUND OF THE INVENTION

Solid oxide fuel cells operate at elevated temperatures requiring the use of an insulation between the fuel cell components and an outside environment. Known insulating materials include refractory insulations and other fibrous and ceramic based insulation materials. However, such insulations are typically mechanically weak and do not have sufficient structural rigidity for supporting other members. Additionally, the insulating materials are not airtight and are permeable to gas.

There is therefore a need in the art for an insulation assembly that may be utilized in conjunction with a fuel cell that has an improved mechanical robustness capable of supporting other components. There is also a need in the art for an insulation for use with a fuel cell that has sufficient structural rigidity to provide shock resistance and mechanical dampening characteristics. There is further a need in the art for an insulation for a fuel cell that is gas impermeable for sealing gases within the fuel cell.

SUMMARY OF THE INVENTION

In one aspect, there is disclosed a high temperature composite insulation assembly for a fuel cell that includes a core portion having inner and outer surfaces. A temperature stable sealant is disposed on the outer surface of the core portion forming a gas retaining mechanically robust insulation assembly.

In another aspect, there is disclosed a high temperature composite insulation assembly for a fuel cell that includes a core portion having inner and outer surfaces, and a reinforcing material disposed on the outer surface of the core portion. A temperature stable sealant is disposed on the outer surface of the core portion forming a gas retaining mechanically robust insulation assembly.

In another aspect, there is disclosed a high temperature composite insulation assembly for a fuel cell that includes a core portion having inner and outer surfaces and a high temperature refractory material disposed on the inner surface of the core portion. A reinforcing material is disposed on the outer surface of the core portion and a temperature stable sealant is disposed on the outer surface of a core portion forming a gas retaining mechanically robust insulation assembly.

BRIEF DESCRIPTION OF THE DRAWINGS

FIG. 1 is a perspective view of a high temperature composite insulation assembly;

FIG. 2 is a perspective view of a core portion of the composite insulation assembly;

DETAILED DESCRIPTION OF THE PREFERRED EMBODIMENTS

Figures 3, 4:
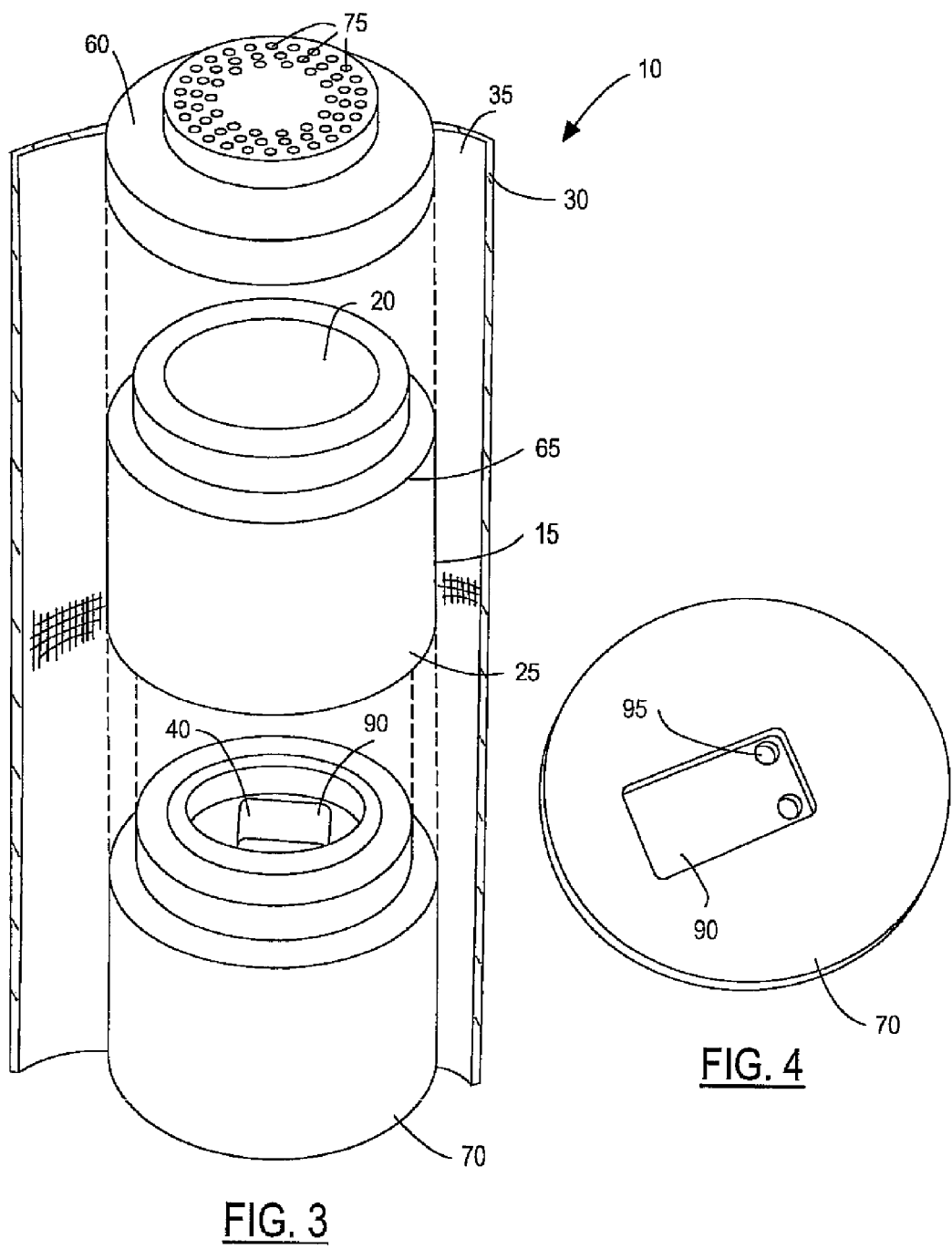
FIG. 3 is an exploded perspective view of a core portion of the composite insulation assembly including a reinforcing material disposed on the outer surface of the core portion.
FIG. 4 is a top view of a bottom section of the core portion.

Referring to FIG. 1, there is shown one embodiment of a composite insulation assembly 10. The composite insulation assembly 10 includes a core portion 15 having inner and outer surfaces 20, 25. A temperature stable sealant 30 is disposed on the outer surface 25 of the core portion 15 forming a gas retaining mechanically robust insulation assembly. In one aspect, the high temperature composite insulation assembly 10 may include a reinforcing material 35 disposed on the outer surface 25 of the core portion 15 and is covered with the temperature stable sealant 30 described above. The reinforcing material 35 may be formed of suitable materials including fiberglass, fibrous materials as well as other strengthening materials that are stable at a temperature of from 30 to 200 degrees Celsius. In one aspect, fiberglass materials in the form of a sheet may be wrapped around the outer surface 25 of the core portion 15 to which the temperature stable sealant 30 is applied.

The core portion 15 may be formed of a high temperature resistant material. The high temperature resistant material may include rigid microporous materials as well as other known materials suitable for insulating high temperature applications. Such microporous materials include air contained in minute cells between chains of amorphous silica agglomerates of particles from 5 to 25 nm, which is many thousand times smaller in diameter than a human hair. In one aspect, the core portion 15 may be formed from a piece of rigid insulation such as Microtherm HT, a product of Microtherm N.V., a Belgian corporation. Additionally, other insulating materials that may be used include Excelfrax made by Unifrax, Microsil made by Zircar, Mini-IC made by Thermal Ceramics, and Flixipor made by Culimeta. While the above list of materials provides examples of various materials that may be used for the core portion 15, it is to be understood that various other high temperature resistant materials may be used. The core portion 15 may be machined or otherwise formed into a desired shape to house the various components of a fuel cell.

The temperature stable sealant 30 disposed on the outer surface 25 of the core portion 15 may be selected from various materials including polymeric materials, elastomers, silicone elastomers, glass sealants, geopolymers, and cementitious ceramic sealants. The temperature stable sealant 30 should provide substantial gas retaining characteristics when cured and have suitable temperature resistance and capability as described above. In one aspect, the temperature stable sealant may be formed of a silicone rubber adhesive sealant such as RTV116 adhesive sealant, a product of GE Silicones of Waterford, N.Y. The temperature stable sealant 30 may be applied using any suitable method such as spraying or coating, cold setting or firing or curing depending on the type of temperature stable sealant being utilized.

The high temperature composite insulation assembly 10 may also include a high temperature refractory material 40 disposed on the inner surface 20 of the core portion 15. The high temperature refractory material 40 may be selected from various materials including alumina cement, alumina-silica cement, sol-gel binders, and thermochemically compatible materials formed of alumina, silica and zirconia. The high temperature refractory material 40 disposed on the inner surface 20 of the core portion 15 may be utilized for hard facing, dust isolation, and to decrease the gas permeability of the core portion 15. Additionally, the high temperature refractory material 40 may be utilized to fix various components of the fuel cell within the inside of the composite insulation assembly 10.

The high temperature composite insulation assembly 10 may also include shock-absorbing members 45 attached to the outside of the temperature stable sealant 30. Additionally, vibration-dampening members 50 may also be attached to the outside of the temperature stable sealant 30. As shown in FIG. 1, the shock-absorbing and vibration-dampening members 45, 50 may be elastomeric tubular sections that are fixed to the temperature stable sealant 30 and provide a barrier between a rigid or structural component (not shown) that may house a fuel cell and provide an outer protective barrier for the fuel cell.

Figure 5:
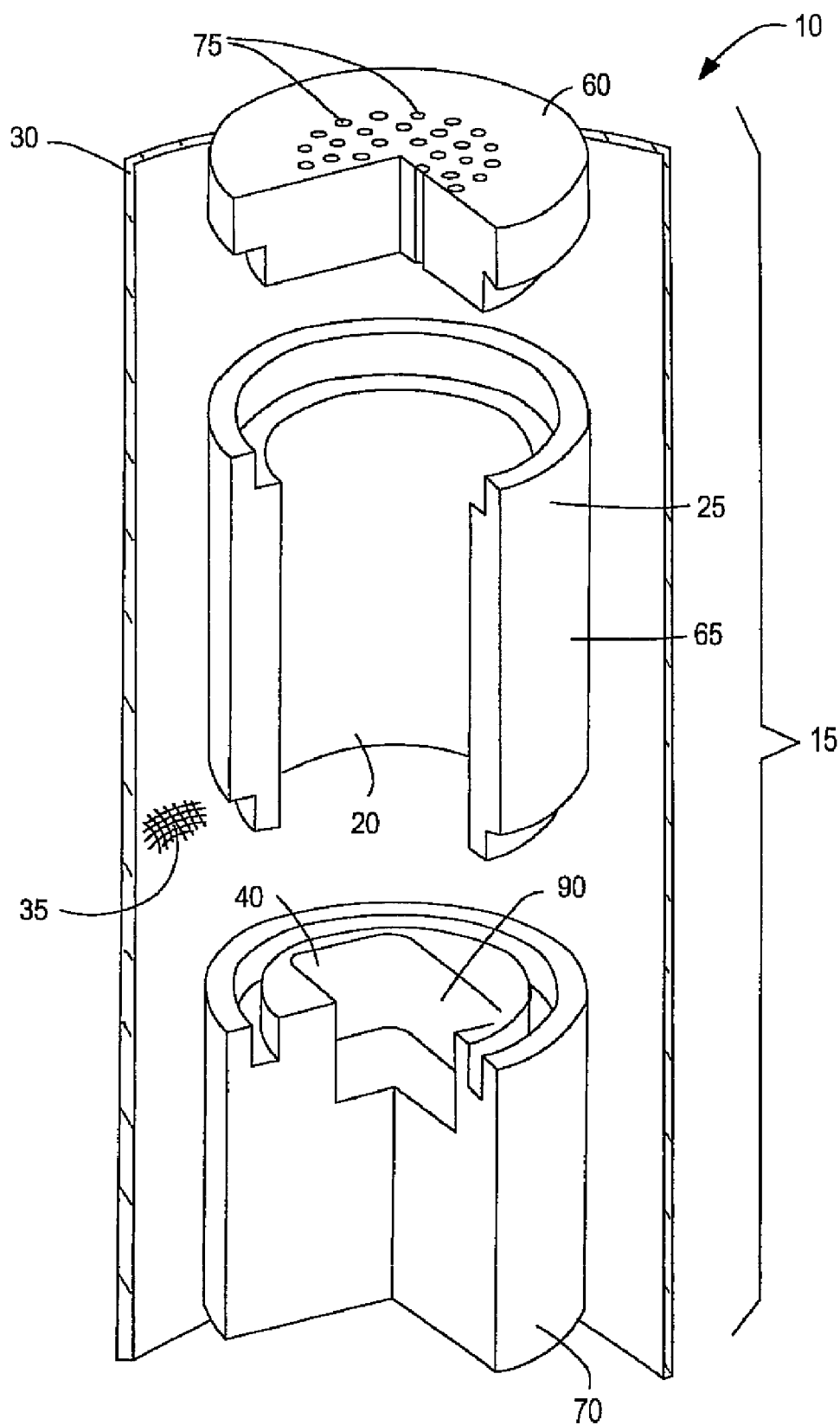
FIG. 5 is a perspective view of an alternative embodiment of a composite insulation assembly.

Referring to FIGS. 3 and 5, there are shown various embodiments of the core portion 15 that includes a cylindrical body 55 having a top section 60, center section 65 and a bottom section 70 that may be joined together. While three sections are shown in the depicted embodiment, it should be realized that various numbers of sections including a two-piece section or other numbers of sections may be utilized. As shown in the depicted embodiment, the top section 60 may include holes 75 formed therein that receive fuel cell tubes. As shown in the depicted embodiment, the top section 60 may be attached to the fuel cell tubes as well as to an inlet manifold 85. The inlet manifold 85 may be utilized to support various inputs and outputs of the fuel cell including air input lines as well as fuel input lines and electrical feeds. The bottom section 70 of the core portion 15, shown in FIG. 4 may include a cavity 90 formed therein that may be used for attaching a recuperator. Additionally, holes 95 may be formed in the bottom section 70 to allow for passage of a cathode air inlet into the recuperator and an exhaust air output from the recuperator.

Utilizing a multi-piece core portion 15 allows for the assembly of several of the fuel cell components within the composite insulation assembly 10 prior to joining of the various components of the core portion 15; thereby simplifying the manufacture of a fuel cell. In one aspect, the fuel cell tubes and the inlet manifold 85 may be attached to the top section 60 of the core portion 15 while a recuperator is disposed within the cavity 90 formed in the bottom section 70. The recuperator may be coated with a refractory material 40, described above with respect to the inner surface 20 of the core portion 15. Next the multiple pieces of the core portion 15 may be assembled together and wrapped with a fiberglass reinforcing material 35 followed by a coating or application of the temperature stable sealant 30 on the outside surface 25 of the core portion 15 providing a gas tight mechanically robust insulation assembly. The shock-absorbing and vibration-dampening members 45, 50 may be applied on top of the temperature stable sealant 30 such that they are affixed to the high temperature composite insulation assembly 10 to provide shock isolation between the composite insulation and a fuel cell package.

As can be seen in FIGS. 3 and 5, various annular forms including annular projections and corresponding annular notches formed in the core portion 15 may be utilized to join the various sections of the core portion when assembled. For example, in FIG. 3, the bottom section 70 of the core portion 15 may include an annular projection 100 that is received in a corresponding annular slot 105 formed in the center section 65. Alternatively, the annular projection 100 and slot 105 may be reversed as shown in FIG. 5.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A method for assembling a solid oxide fuel cell assembly comprising the steps of:
   providing a core portion (15) including a top section (60) and a bottom section (70);
   attaching an inlet manifold (85) to the top section (60) of the core portion (15);
   assembling components into at least one solid oxide fuel cell tube and attaching the solid oxide fuel cell tube to the top section (60) of the core portion (15);
   joining the top and bottom sections (65, 70) of the core portion (15) together after the step of assembling components into at least one solid oxide fuel cell tube;
   coating a recuperator with a refractory material (40);
   attaching the recuperator to the bottom section (70) of the core portion (15);
   wrapping the unified core portion (15) with a reinforcing material (35);
   applying a temperature stable sealant (30) to the outside of the core portion (15) for providing a gas tight seal around the core portion (15); and
   attaching at least one shock-absorbing member (45) and at least one vibration-dampening member (50) to the temperature stable sealant (30) for protecting the solid oxide fuel cell tube from vibrations.

2. A fuel cell assembly comprising:
   at least one fuel cell; said fuel cell including an air input line, a fuel input line and a recuperator;
   an inlet manifold (85) supporting said air input line and said fuel input line and said electrical feed;
   a hermetically sealed insulation assembly (10) disposed about said fuel cell;
   said insulation assembly (10) including a multi-piece core portion (15) formed of a high temperature resistant and rigid microporous material; said core portion (15) having a top section (60) and a bottom section (70) and presenting an inner surface (20) and an outer surface (25);
   said top section (60) including at least one hole (75) for supporting said fuel cell;
   said inlet manifold (85) being attached to said top section (60) of said core portion (15);
   a high temperature refractory material (40) disposed on said inner surface (20) of said core portion (15); and
   a temperature stable sealant (30) disposed substantially completely about said outer surfaces of said top and bottom sections (65, 70) of said core portion (15) for providing a gas tight seal, whereby said sealant (30) substantially envelops said insulation assembly (10) to provide a thermal and hermetic seal.

3. The fuel cell assembly of claim 2 wherein said core portion (15) has a cylindrical shape.

4. The fuel cell assembly of claim 2 wherein said fuel cell is a solid oxide fuel cell.

5. The fuel cell assembly as set forth in claim 2 wherein said temperature stable sealant (30) is selected from polymeric materials, elastomers, silicone elastomers, glass sealants, geopolymers and cementituous ceramic sealants.

6. The fuel cell assembly as set forth in claim 2 wherein said high temperature refractory material (40) disposed on said inner surface (20) of said core portion (15) is selected from alumina cement, alumina-silica cement, sol-gel binders and thermo chemically compatible materials formed of alumina, silica and zirconia.

7. The fuel cell assembly of claim 2 further including a plurality of vibration-dampening members (50) attached to said temperature stable sealant (30).

8. The fuel cell assembly of claim 2 further including a plurality of shock-absorbing members (45) attached to said temperature stable sealant (30).

9. The fuel cell assembly of claim 8 wherein the shock-absorbing members (45) are elastomeric tubular sections.

10. The fuel cell assembly as set forth in claim 2 wherein said bottom section (70) of said core portion (15) includes a cavity (90) formed therein for attaching said recuperator.

11. The fuel cell assembly as set forth in claim 2 wherein said multi-piece core portion (15) further includes a center section (65) extending between said top and bottom sections (60, 70).

12. The fuel cell assembly as set forth in claim 2 further including a cathode air inlet and an exhaust air output and wherein said bottom section (70) of said core portion (15) presents at least one hole (95) for allowing passage of said cathode air inlet and said exhaust air output.

* * * * *